US007520746B1

(12) United States Patent
Johnston et al.

(10) Patent No.: US 7,520,746 B1
(45) Date of Patent: Apr. 21, 2009

(54) ANNEALING FURNACE COOLING AND PURGING SYSTEM AND METHOD

(75) Inventors: Gwynne Johnston, Barrrington Hills, IL (US); Michael E. Kubis, Lake Villa, IL (US)

(73) Assignee: Temple Steel Company, Chicago, IL (US)

( * ) Notice: Subject to any disclaimer, the term of this patent is extended or adjusted under 35 U.S.C. 154(b) by 0 days.

(21) Appl. No.: 11/758,092

(22) Filed: Jun. 5, 2007

(51) Int. Cl.
*F27B 9/02* (2006.01)
*B32B 15/01* (2006.01)

(52) U.S. Cl. ...................... 432/128; 432/152; 148/516; 266/252

(58) Field of Classification Search .................. 432/77, 432/48, 78, 82, 83, 128, 133, 152, 144, 149; 148/287, 307, 516, 527, 529; 266/250, 252
See application file for complete search history.

(56) References Cited

U.S. PATENT DOCUMENTS

| | | | | |
|---|---|---|---|---|
| 1,867,122 A * | 7/1932 | Watts | 432/77 |
| 2,134,906 A * | 11/1938 | Byron | 432/48 |
| 3,172,647 A * | 3/1965 | Remmey | 432/47 |
| 3,453,708 A * | 7/1969 | Johnson | 432/83 |
| 4,249,895 A * | 2/1981 | Mantegani | 432/78 |
| 4,527,974 A * | 7/1985 | Carraroli et al. | 432/78 |
| 4,932,864 A * | 6/1990 | Miyabe | 432/77 |
| 6,064,040 A * | 5/2000 | Muller et al. | 219/388 |
| 6,357,910 B1 * | 3/2002 | Chen et al. | 374/131 |
| 7,371,296 B1 * | 5/2008 | Johnston et al. | 148/516 |

FOREIGN PATENT DOCUMENTS

WO WO03/068997 A1 * 8/2003

OTHER PUBLICATIONS

Two drawings of a 1998 prior art lamination furnace for annealing laminations.
Effective Cooling of Components in Continuous Nitrogen-Hydrogen Atmosphere Furnace—Garg et al Industrial Heating/Feb. 1997.

* cited by examiner

*Primary Examiner*—Gregory A Wilson
(74) *Attorney, Agent, or Firm*—Schiff Hardin LLP

(57) ABSTRACT

In a method and system for an improved annealing furnace cooling and purging, atmosphere injection jets are provided in close proximity to a bottom of a tray carrying a lamination product in a cooling section. Atmospheric extraction tubes are also provided extracting atmosphere which is delivered to a high temperature variable speed fan which then outputs at a pressure side atmosphere to tubes having the injection jets. The system may be retrofit into an existing annealing furnace already having water cooled finned tubes and a recirculation fan in the cooling section. Cooling water tubes and a recirculating fan may also be provided in a purge vestibule located after an output from the cooling section for additional cooling.

30 Claims, 4 Drawing Sheets

ANNEALING FURNACE COOLING AND PURGING SYSTEM AND METHOD

RELATED APPLICATIONS

The present application is related to parent application Ser. No. 10/857,824 titled: "Improved Annealing Furnace Cooling And Purging System And Method," filed Jun. 1, 2004, inventors Gwynne Johnston and Michael E. Kubis.

This application is also related to Ser. No. 10/858,185 titled: "Improved Annealing Furnace Purging And Oxidation System And Method," filed Jun. 1, 2004, inventors Gwynne Johnston and Michael E. Kubis, and a divisional application of that application Ser. No. 11/758,085, titled: "Improved Annealing Furnace Purging And Oxidation System And Method" filed Jun. 5, 2007.

BACKGROUND

Steel laminations typically employed for motors, transformers, and other electrical devices are annealed in continuous roller hearth furnaces to improve magnetic properties. Steel laminations form the magnetic path in electrical devices which allows transfer of magnetic flux such as from a stator to a rotor in the case of a motor, for example, or completing a magnetic circuit in the case of a transformer. The performance of the laminations depends on the magnetic properties of the steel used to make the laminations. Typically the best magnetic properties are achieved following heat treatment or annealing of the laminations after stamping.

Annealing is a process of heat treatment of steel to both soften and to impart specific magnetic properties.

High productivity processes are important for annealing, and therefore continuous roller hearth furnaces are employed in the prior art. The rollers in the furnace are driven externally so that trays of laminations progress continuously through the furnace and the different processes involved.

A typical prior art lamination furnace comprises a high heat section, a controlled cooling section, a purge or transfer vestibule, a controlled oxidation section, and an air cool section.

It is known to provide the high heat section of the furnace with a controlled atmosphere that prevents the laminations from oxidizing during heating, and allows decarburization or removal of carbon.

Temperatures in the laminations are increased from approximately 650° F. to a soak temperature in the range of 1450-1600° F. depending upon the alloy content of the steel. The time of transfer through the high heat section can range from 90 to 150 minutes, depending on the carbon content and alloy content of the steel. An important critical part of the heating cycle is the actual soak time at the specified temperature, which is a function of both alloy content and carbon content. From a fundamental perspective, the soak time at temperature is fixed for each grade to permit both decarburization and recrystallization.

The controlled cooling section of the furnace allows the rows of laminations to cool uniformly from the soak temperatures of the high heat section to a temperature at which a uniform blue/gray oxide may be formed in the oxidation section. In most cases, the atmosphere is similar for the heating and cooling sections of the furnace and the sections are not physically separated. Although the exact cooling rate in the cooling section is not important for silicon alloy steels, it is important that the laminations achieve a uniform surface temperature throughout the load that, on exit from the purge sections, does not exceed 1000° F. An unstable iron oxide forms above this temperature and breaks down into cosmetically deleterious iron oxide products. Below 600° F., cosmetic problems also occur. Non-uniformity of loading or the inclusion of rows of laminations of different sizes leads to non-uniformity of cooling. In most cases this will result in non-uniform cosmetics since different oxide compositions and thicknesses form at different temperatures. Thus, control of uniformity of cooling is important.

It is also known to provide a purge or transfer vestibule to separate the atmosphere and the control cooling and heating sections of the furnace from ambient conditions. The function of the purge or transfer vestibule is to provide an inert atmosphere barrier so that laminations may be removed from the potentially explosive gas mixture without contact with air. Operating conditions for the purge section usually require that the static pressure be maintained at values slightly higher than the static pressure of the controlled cool section to minimize leaks of potentially explosive gas. A controlled oxidation section follows the purge vestibule. Here, a blue/gray oxide is formed on the surface of the annealed steel laminations. This oxide serves to provide a measure of electrical insulation for each of the laminations. The optimum temperatures known in the prior art for oxidation of steel to form a blue/gray reaction product range from above 600° to below 1000° F.

It has been known in the prior art cooling section to provide thin tubes containing a fluid such as water or air to cool the atmosphere by conduction into the fluid. Typically these have been arranged both above and below rollers of the transport conveyor, but at a substantial distance above and below the conveyor. Also it has been known to provide a re-circulation fan at the top of the chamber. These prior art structures are shown as the cooling water tubes 20 and 21, and recirculation fan 22 in FIG. 2.

In the prior art system, in order to increase production speeds, the heating section must be lengthened and the cooling section must be lengthened so that the resident time of the product in the heating section and the cooling section does not change as the conveyor is speeded up. This substantially increases cost both from a construction standpoint and from an energy standpoint.

SUMMARY

It is an object to improve productivity of an annealing furnace by increasing the effectiveness of the cooling section and purge section so that the conveyor speeds can be increased or so that the relative length of the cooling section can be shortened which, for a given existing furnace length, allows a lengthening of the heating section to improve efficiency, speed of production, and lower cost.

With the disclosed system and method, a diffused rapid uniform cooling is provided to increase the cooling efficiency. In a preferred embodiment, a plurality of jets for convection cooling are provided in close proximity to trays carrying product to be cooled. Atmosphere extraction tubes are provided to collect and recirculate the atmosphere being expelled at the convection jets.

DESCRIPTION OF THE PREFERRED EMBODIMENTS

Figure 1:
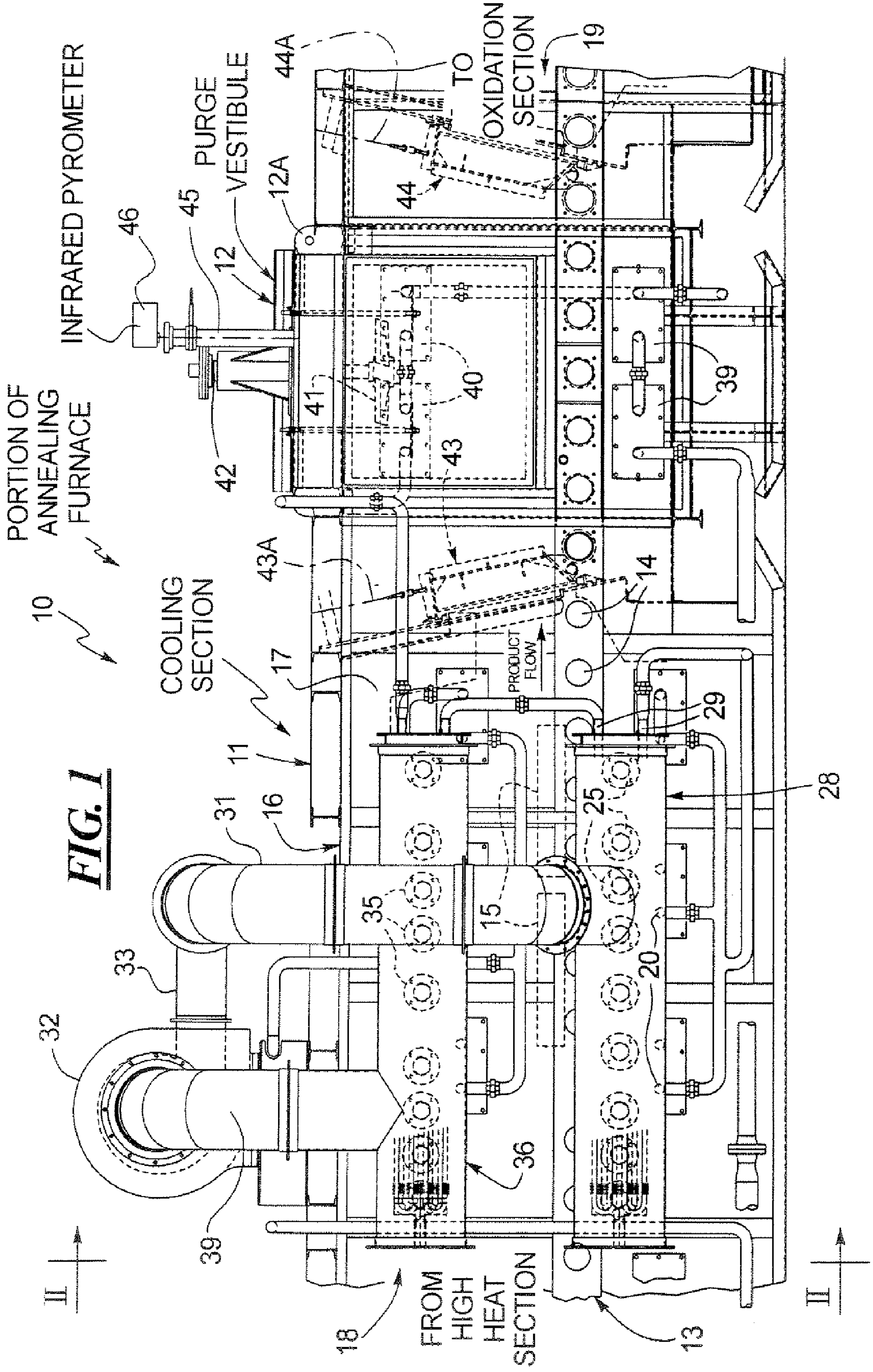
FIG. 1 is a side view of a cooling section and a purge vestibule of a lamination annealing furnace.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
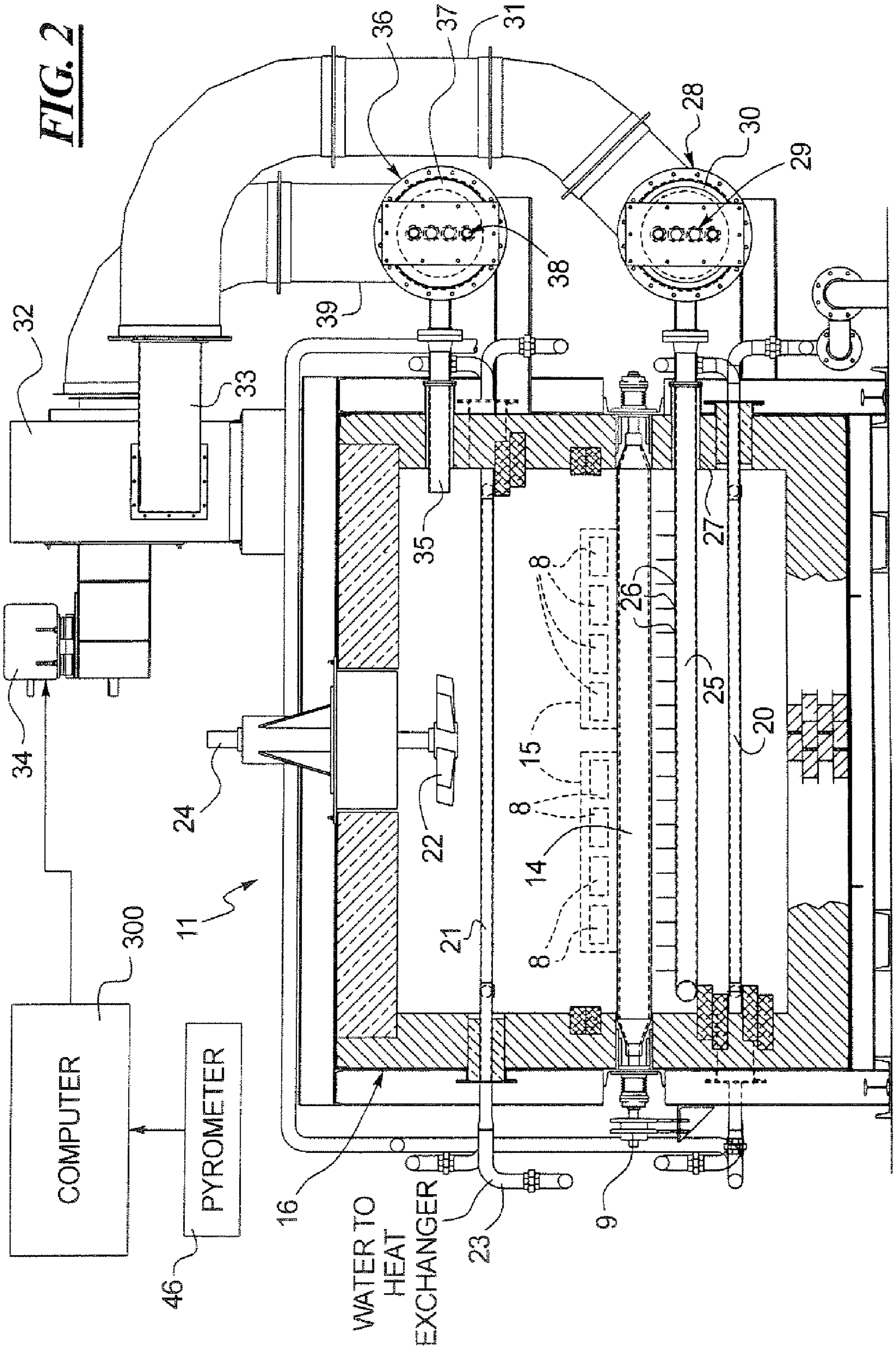
FIG. 2 is a cross-section taken along line II-II of FIG. 1.

A portion of an annealing furnace for laminations is generally shown at 10 in FIGS. 1 and 2. A transport conveyor 13 runs through the furnace and comprises a plurality of rollers 14 driven such as by gears or belts shown at 9 in FIG. 2. As illustrated in both FIGS. 1 and 2, a plurality of trays 15 are conveyed along the rollers 14. Each of these trays 15 contain a plurality of lamination bundles or stacks 8.

As shown most clearly in FIG. 1, the lamination trays are conveyed from a high heat section 18 to a cooling section 11, a purge vestibule 12, and to an oxidation section 19.

The cooling section 11 will now be described with reference to FIGS. 1 and 2. The furnace has a chamber 16 with an atmosphere 17 containing hydrogen. Finned cooling tubes 20 preferably carrying water cooled by a heat exchanger are provided at a lower portion of the cooling section near the floor thereof. A plurality of additional finned cooling tubes 21 also containing water are provided at a top portion of the cooling section. Tubes 21 are also connected at pipe 23 to a water heat exchanger not shown.

Although water is preferred as a cooling medium in the tubes discussed above and hereafter for cooling by conduction, other fluids may be used such as air.

At the top of the cooling section a recirculation fan 22 driven by a fan motor at 24 is provided. The water cooled finned tubes 20 and 21 extend in a direction perpendicular to a transport direction of the trays 15 with the lamination product.

As shown most clearly in FIG. 2, a plurality of atmosphere conveying tubes 25 having a plurality of atmosphere injection jets 26 are arranged in a direction extending transverse to the feed direction for the trays 15 containing the laminations 8. The jets may be formed by apertures, nozzles, or other structures in the top of the plurality of tubes 26. Significantly, the tubes 25 are arranged very close to the rollers 14 of the conveyor and preferably each tube 26 is arranged directly below the gap between adjacent rollers 14. Thus, the atmosphere jets blow directly against the bottom of the trays 15 in close proximity thereto causing an even and spread out cooling effect over the entire bottom of the trays. Also turbulence is increased in the vicinity of the laminations in the trays which advantageously disrupts the stagnant boundary layer at the surface of the lamination stacks.

Tubes 25 exit through respective exit apertures 27 in the sidewall of the furnace housing 16 where they connect with a pressure manifold 28 extending in the direction of travel of the trays 15. The pressure manifold 28 has a circumferential inner refractory lining 30 and a plurality of interiorly located finned tubes 29 carrying water. These water carrying tubes are preferably connected into the same heat exchanger system as the previously mentioned existing water carrying tubes 20 and 21 when retro-fitting the furnace. Thus these water carrying finned tubes 29 cool the atmosphere as it passes through the pressure manifold 28.

The pressure manifold 28 is connected upwardly by duct work 31 to an outlet 33 from a high temperature fan 32. This high temperature fan 32 is driven by a variable speed drive motor 34 controlled by computer 300 as a result of signals received from one or more pyrometers 46 shown in FIG. 1 at an opening 45 of the purge vestibule 12. The pyrometer signals are fed to the computer 300 which controls motor 34. The computer may operate with software algorithms taking into account various operation parameters.

The high temperature fan 32 has an input receiving fan exhaust duct 39 from a suction manifold 36, which also has a refractory peripheral lining 37. The manifold 36 also has a plurality of finned tubes 38 carrying water for cooling atmosphere sucked from the cooling section of the furnace.

As shown most clearly in FIG. 2, a plurality of atmosphere extraction tubes 35 are arranged along a running direction of the conveyor which suck atmosphere from the interior of the cooling section.

Figure 3:
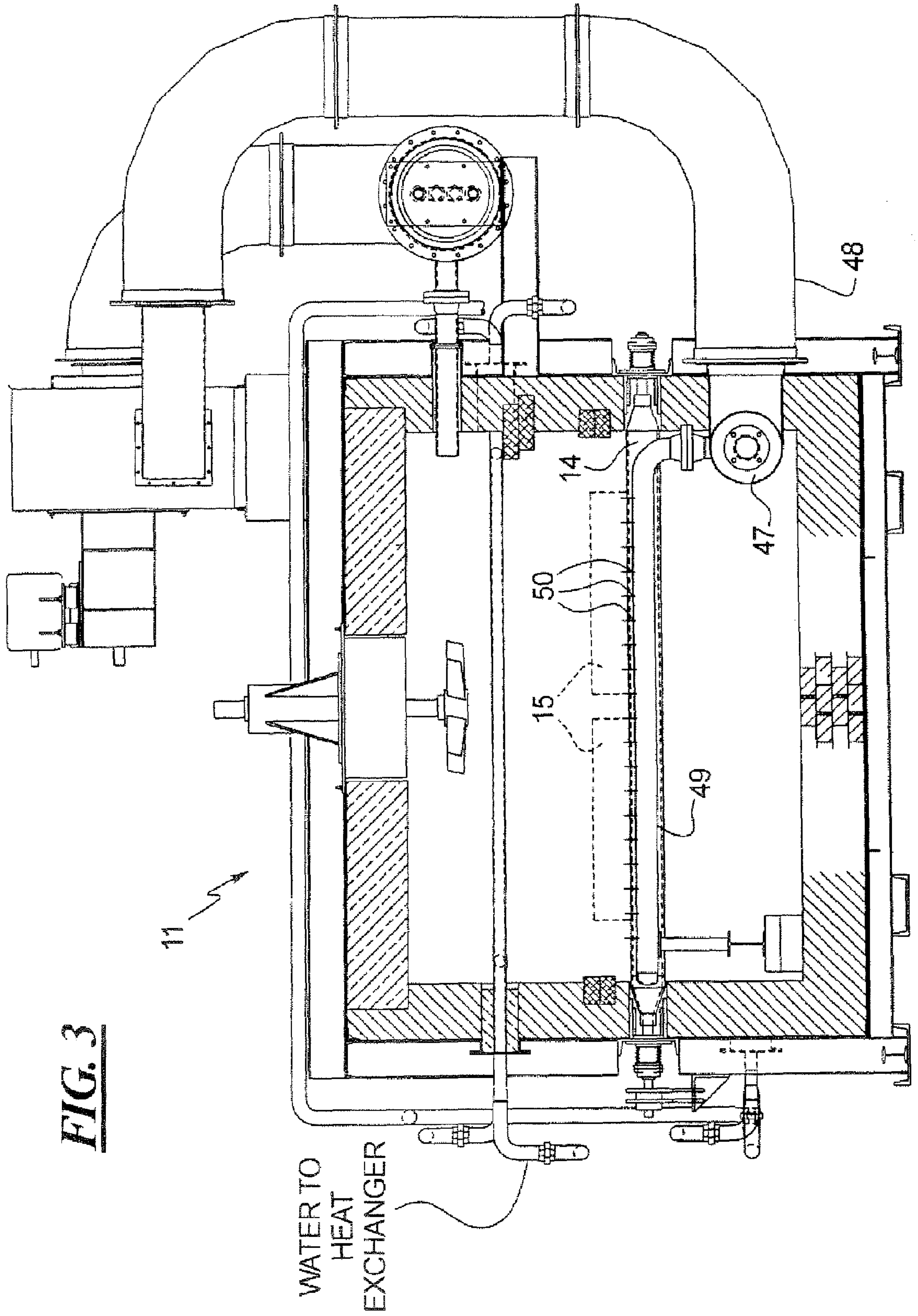
FIG. 3 is an alternate embodiment of FIG. 2.

FIG. 3 shows an alternate embodiment of the cooling section 11 wherein the pressure manifold 47 feeding atmosphere through the tubes 49 to the injection jets 50 is positioned within the furnace cooling section rather than exteriorly thereof as was the case in FIG. 1 and FIG. 2. Also, it may be noted in this alternate embodiment, that the atmosphere injection tubes 49 with their associated injection jets 50 are positioned directly between rollers 14 of the conveyor and thus even closer to the bottom of the trays 15 than was the case in the FIG. 2 embodiment.

The purge vestibule 12 will now be described with reference to FIG. 1. At an exit end of the cooling section 11, a furnace door 43 is controlled by a cable **43*a* is provided. The purge vestibule 12 is formed of a chamber 12*a* having a recirculation fan 41 therein driven by a motor 32. An opening 45 is provided having the previously described infrared pyrometer 46 at the opening. Finned cooling tube assembly 40 having a plurality of cooling tubes with cooling water circulating therethrough are provided. These tubes lie above the conveyor 13. Also, below the conveyor additional finned tube assembly 39 having a plurality of tubes are provided carrying cooling water. The cooling water for finned tube assemblies 39 and 40** is preferably connected to the same cooling water system as previously described for the cooling section and also is cooled by a same common heat exchanger, for example.

At the output of the purge vestibule 12 a second oxidation door 44 is provided controlled by a cable 44A. After the purge vestibule 12 in the conveying direction lies the oxidation section 19.

Figure 4:
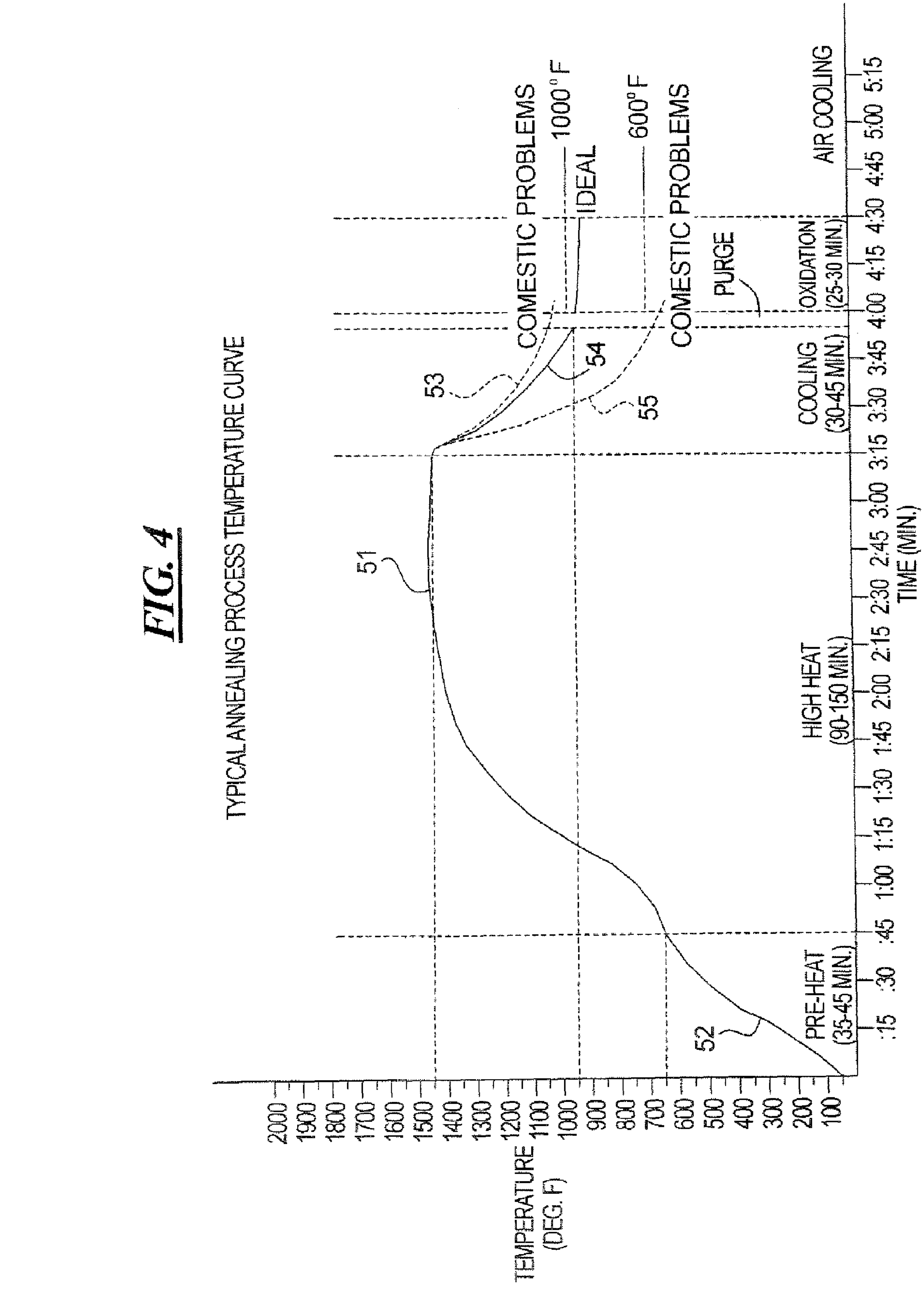
FIG. 4 is a graph showing temperature versus time through the annealing furnace of FIGS. 1-3.

As shown in FIG. 4, a typical temperature versus time curve for the entire annealing process is shown. The pre-heat portion of the curve 52 shows an increase of temperature in the laminations from ambient during the pre-heat process. In the high heat process in the heating section as shown by curve 51 temperatures reach approximately 1450°. The cooling section then cools as shown by curve 54 to an ideal temperature for entry into the purge vestibule of approximately 950° F. Preferably the temperature entering the oxidation chamber should lie in a range between 600° F. and 1000° F. If, as shown by curve 53, the temperature is too high, cosmetic problems occur during the oxidation process to the lamination material. Similarly, if the temperature is too low as shown by curve 55 entering the oxidation process cosmetic problems also occur to the lamination material.

With the disclosed system and method, dispersed rapid uniform cooling is used to improve the efficiency of the cooling. The disclosed system and method may utilize retrofit components for a furnace already having the previously described prior art water or air cooling tubes 20, 21 and recirculating in the fan 22 in the cooling section. The disclosed system and method may also be employed, of course, in a new annealing furnace where the convection air cooling with the injection jets and related atmosphere extraction tubes may be employed along with the water cooling tubes and recirculation fan.

For furnace retrofits, with the present method and system the heating zone can be extended while the cooling section is shortened without major structural change to the furnace, including its existing overall length.

With the present system, the predominant mechanism for cooling is convection. Without the convection provided by the present system and method, a stagnant boundary layer surrounds the stack of laminations which would act as a barrier to heat transfer. If this boundary layer can be reduced or eliminated, the rate of heat transfer increases. The thickness of the boundary layer is a function of, among other things, the velocity of the gas in contact with the solid part. With the present system and method, by providing the jets in close proximity to the trays, significant turbulence is created in and around the trays which disrupts the boundary layer surrounding the lamination stacks. This significantly increases the cooling effect.

The dispersed rapid uniform cooling involves the removal of combustible gas from within the furnace, cooling over water cooled tube heat exchangers, and then forcing the atmosphere back through jets as close as possible to the bottom of the tray in the rollers.

The tubes with the atmosphere injection jets may also be located either directly above the trays on the conveyor or at sides of the conveyor.

By providing the high velocity jets directly beneath the trays, maximum convective heat transfer is provided which may also be adjusted by varying the speed of the high temperature fan drive motor to provide uniform dispersed cooling throughout the non-uniform thermal load represented by the tray and its lamination stack contents. The present design reduces the effects of the thermal load of the heavy steel trays.

Significantly, the disclosed method is monitored and controlled precisely by means of the output from the infra-red pyrometer or pyrometers in the transfer vestibule which verify that loads are transferred at correct thermal conditions without under or over cooling. As previously described, under or over cooling can cause cosmetic problems in the appearance of the annealed laminations.

With the present method and system, significantly improvements in productivity of 20 to 30% have been achieved.

The present concepts are not restricted to laminations or roller hearth furnaces and may be extended to other products such as continuous strip where heating and cooling to precise temperatures are the basis of process control and productivity.

With the present method and system, the laminations achieve a uniform surface temperature throughout the load that, upon exit from the cooling section, does not exceed 1000° F. Above that temperature an unstable iron oxide forms and breaks down into cosmetically deleterious iron oxides. Also non-uniformity of loading is avoided so that uniformity of cooling is achieved. Non-uniform cooling will result in non-uniform cosmetics. Thus control in any desired range for the temperature output from the cooling section is important.

With laminations wired or stacked together, the present method and system is a substantial improvement for the following reasons. Stacked or wired together laminations have individual surfaces between the laminations which act as barriers to heat transfer. However, the present system relying substantially on convection and uniform cooling by the atmosphere injection jets blowing directing on the bottom of the trays promotes uniform cooling of all laminations With the atmosphere cooling jets, the velocity profile thereof after the exit is a function of differential pressure and diameter of orifice. The velocity decays as a function of the square of the distance from the orifice. Thus, by placing the jets close to the bottom of the tray distance is minimized thus effecting a uniform and effective cooling of the bottom of the tray.

The jets blow on the bottom of the tray while the tray is moving but in a uniform manner in view of the large plurality of jets provided so that a diffused uniform plurality of jets are applied to the potentially non-uniform load. The tray is typically heavy with a substantial inert thermal mass and the application of jets directly to this thermal mass greatly improves heat transfer efficiency from the total load. Irrespective of loading patterns the greatest thermal mass is concentrated at the bottom of the tray in the present system.

Significantly, by use of the infra-red pyrometers in the purge or transfer section, this permits direct measurement of the surface temperatures of the laminations prior to transfer to the control oxidation section. Observation of this surface temperature during a residence time in the purge section verifies that neither under-cooling nor over-cooling conditions are present, and thus, the total load may be transferred within the desired correct temperature range for controlled oxidations. Control of the cooling can be accomplished by changing the variable speed drive motor for the high temperature fan relating to the atmosphere injection jet feed.

In the retrofit situation where the injection jets and related atmospheric extraction tubes are added to the existing cooling water tubes and recirculating fan system in the cooling section, a ratio of heating section length to cooling section length of 7 to 2 can now be achieved. Corresponding increases and productivity, compared to the best prior art lamination and annealing ovens of 20 to 30% are achieved with the present system.

With the present system and method, in the retrofit situation the heating zone may be extended while the cooling zone is reduced in length. This permits the same total soak time-at-temperature to be achieved in the heating section for the laminations by utilizing higher speeds and a longer heating section. Thus the overall structural integrity of the furnace and drive system is maintained without excessive costs for retrofitting or expansion of the system. It is important to note that the total soak time-at-temperature is an important quality parameter and may not be reduced whereas the time for cooling is not critical and is limited only by the rate of heat extraction.

In the atmosphere injection tubes, the spacing, number, and diameter of the holes is subject to calculation based on the pressure head achieved by the fan, the distance from the bottom of the trays, and desired velocity at the tray. The internal diameter of the atmosphere injection tubes is chosen so that a uniform pressure exists at each hole or jet. The design of the orifices is not limited to circles or holes and may be rectangles or more complex fan designs.

By providing the variable speed motor for the high temperature fan, the pressure or velocity distribution of the jets can be adjusted or varied to suit the tray loads.

In the second embodiment of FIG. 3, with the pressure manifold located inside the furnace, the atmosphere injection tubes are connected to the pressure manifold by inverted “L” shaped tubes instead of straight tubes. Here the horizontal section of the tube along with the holes is located directly between the rolls. This design has the major advantage that the top of the tubes may be located as closely as possible to the bottom of the trays without interference from external bearings, drives or structural sections of the furnace. This design also minimize conflict of external duct work with other equipment on the outside of the furnace.

The previously cited re-circulation fan 22 may also be operated using the variable speed motor or a fixed feed motor.

The surface temperature of the laminations reach a range of 600° F. to 1000° F. at the end of the cooling section before transfer to the purge vestibule. By the outlet temperature from the cooling section of the laminations lying within this range, discoloration is substantially avoided in the laminations, and with the present system, a uniform blue/gray oxide results in the oxidation section.

At the purge vestibule, when a tray of laminations reaches the correct location at the end of the controlled cooling section, the furnace door is opened and a separate roll drive accelerates the tray into the purge or transfer section. The furnace door 43 is then closed and the tray of laminations resides in the purge section for a time which may be adjusted permitting equilibrium of an inert atmosphere and equilibrium of temperature throughout the load.

The water cooled finned tubes combined with the recirculation fan provide additional cooling in the purge section or vestibule.

The tray with laminations resides in the purge vestibule for an appropriate time to ensure that an inert atmosphere exists therein. If the infra-red pyrometer 46 confirms that the temperature of the parts is uniformly between 600° F. and 1000° F., the opposite furnace door 44 is opened and the tray of laminations is accelerated using a separate transfer drive into the controlled oxidation section. Furnace door 44 is then closed when the tray of laminations completely enters the controlled oxidation section. The inert atmosphere is then re-established in the purge section in preparation for the next tray and the process is repeated.

The temperature-time information output from the infrared pyrometer is processed such as through a computer based algorithm and provides the control signal to the variable speed drive motor to control the high temperature fan in the cooling section. In this way, the rate of cooling is controlled precisely so that suitable temperatures are achieved throughout the load, preventing either under-cooling or over-cooling while still achieving maximum productivity.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

We claim as our invention:

1. An electrical device steel lamination annealing furnace, comprising:

a lamination high heat section followed by a lamination cooling section, a lamination purge vestibule, and a lamination oxidation section;

a conveyor running from the high heat section through the cooling section, purge vestibule, and oxidation section;

the conveyor carrying electrical device steel laminations being annealed which are first heated and then cooled in a plurality of trays;

the cooling section having a plurality of atmosphere injection tubes each having a plurality of atmosphere injection jets, the injection jets being beneath the conveyor and spaced in close proximity to the trays on the conveyor and positioned to blow directly onto the trays from below the trays on the conveyor;

the cooling section also having at least one atmosphere extraction tube lying above the conveyor and positioned to extract atmosphere in a region of the conveyor above where said injection jets are located; and a fan having an output connected to said atmosphere injection tubes and an input connected to the atmosphere extraction tubes.

2. A furnace of claim 1 wherein the fan is driven by a variable speed drive motor controlled by a control signal, the injection jets are positioned directly below the conveyor, and a plurality of said extraction tubes are provided.

3. A furnace of claim 2 wherein a sensor is provided sensing temperature and providing a control signal used to control the variable speed drive motor.

4. A furnace of claim 3 wherein the sensor comprises an infra-red pyrometer located to sense temperature of the laminations inside said purge vestibule.

5. A furnace of claim 2 wherein the atmosphere extraction tubes connect to a suction manifold exterior of a chamber of the cooling section which connects through duct work to the input of the fan.

6. A furnace of claim 5 wherein the suction manifold comprises at least one cooling tube therein.

7. A furnace of claim 6 wherein the cooling tube is finned.

8. A furnace of claim 6 wherein the cooling tube conveys fluid.

9. A furnace of claim 6 wherein a plurality of said cooling tubes are provided in said suction manifold.

10. A furnace of claim 5 wherein the suction manifold has a peripheral refractory material inside of which the extracted atmosphere passes.

11. A furnace of claim 1 wherein the plurality of atmosphere injection tubes connect to a pressure manifold which connects through duct work to said output from said fan.

12. A furnace of claim 11 wherein the pressure manifold is located within a chamber of the cooling section.

13. A furnace of claim 12 wherein the conveyor comprises a plurality of rollers and the atmosphere injection tubes are respectively located between respective adjacent rollers of the conveyor.

14. A furnace of claim 12 wherein an L-shape tube connects the atmosphere injection tubes to the pressure manifold.

15. A furnace of claim 11 wherein the pressure manifold is located exteriorly of a chamber of the cooling section and the atmosphere injection tubes pass through a sidewall of the chamber of the cooling section.

16. A furnace of claim 11 wherein the pressure manifold has at least one cooling tube therein.

17. A furnace of claim 16 wherein the cooling tube is finned and conveys fluid.

18. A furnace of claim 1 wherein the atmosphere injection tubes lie directly beneath gaps between adjacent rollers of the conveyor.

19. A furnace of claim 1 wherein at least one cooling tube is provided at least one of above and below the conveyor and in a chamber of the cooling section.

20. A furnace of claim 19 wherein the cooling tube conveys fluid.

21. A furnace of claim 1 wherein a recirculation fan is provided in a chamber of the cooling section.

22. A furnace of claim 1 wherein the atmosphere injection jets of the atmosphere injection tubes comprise apertures at a top of the tubes.

23. A furnace of claim 1 wherein the atmosphere injection tubes run in a direction perpendicular to a movement direction of the trays.

24. A furnace of claim 1 wherein the injection jets run across an entire width of the conveyor.

25. A furnace of claim 1 wherein the purge vestibule has at least one cooling tube.

26. A furnace of claim 25 wherein the cooling tube in the purge vestibule comprises fins.

27. A furnace of claim 1 wherein the purge vestibule comprises a recirculating fan.

28. A furnace of claim 1 wherein the purge vestibule has an inlet furnace door and an outlet oxidation door.

29. A lamination annealing furnace, comprising:

a high-heat section followed by a cooling section, a purge vestibule, and an oxidation section;

a conveyor running from the high heat section through the cooling section, purge vestibule, and oxidation section;

the conveyor being adapted to carry laminations which are first heated and then cooled in a plurality of trays;

the cooling section having a plurality of atmosphere injection tubes each having a plurality of atmosphere injection jets, the injection jets being spaced in close proximity to the trays on the conveyor;

the cooling section also having at least one atmosphere extraction tube lying above the conveyor;

a fan having an output connected to said atmosphere injection tubes and an input connected to the atmosphere extraction tubes;

at least one cooling tube provided at least one of above and below the conveyor and in a chamber of the cooling section; and the at least one cooling tube, at least one cooling tube within a suction manifold for the atmosphere extraction tubes, and at least one cooling tube in a pressure manifold for the atmosphere injection tubes are connected to a water heat exchanger.

30. A lamination annealing furnace comprising:

a high heat section followed by a cooling section, a purge vestibule, and an oxidation section;

a conveyor running from the high heat section through the cooling section, purge vestibule, and oxidation section;

the conveyor being adapted to carry laminations which are first heated and then cooled in a plurality of trays;

the cooling section having a plurality of atmosphere injection tubes each having a plurality of atmosphere injection jets, the injection jets being spaced in close proximity to the trays on the conveyor;

the cooling section also having at least one atmosphere extraction tube lying above the conveyor;

a fan having an output connected to said atmosphere injection tubes and an input connected to the atmosphere extraction tubes;

the purge vestibule having at least one cooling tube; and the cooling tube in the purge vestibule conveys fluid and is connected to at least one cooling tube in the cooling section.

* * * * *